(12) United States Patent
Derouineau et al.

(10) Patent No.: US 7,970,497 B2
(45) Date of Patent: Jun. 28, 2011

(54) SMART HYBRID ELECTRIC AND BLEED ARCHITECTURE

(75) Inventors: Jean-Luc Derouineau, Cornebarrieu (FR); Wayne T. Pearson, Oro Valley, AZ (US); Michel A. Jonqueres, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 1408 days.

(21) Appl. No.: 11/681,686

(22) Filed: Mar. 2, 2007

(65) Prior Publication Data
US 2009/0326737 A1 Dec. 31, 2009

(51) Int. Cl.
*G01C 23/00* (2006.01)
(52) U.S. Cl. .................... 701/3; 701/22; 454/64
(58) Field of Classification Search ............... 701/3, 22; 244/54 R; 307/64; 290/7, 1 A, 40 F, 38 R, 290/40 A; 454/74
See application file for complete search history.

(56) References Cited

U.S. PATENT DOCUMENTS

| | | | | |
|---|---|---|---|---|
| 5,764,036 A * | 6/1998 | Vaidya et al. | | 322/90 |
| 5,813,630 A * | 9/1998 | Williams | | 244/118.5 |
| 5,909,367 A | 6/1999 | Change | | |
| 5,939,800 A * | 8/1999 | Artinian et al. | | 307/64 |
| 5,977,645 A * | 11/1999 | Glennon | | 290/40 F |
| 6,058,715 A * | 5/2000 | Strang et al. | | 62/87 |
| 6,124,646 A * | 9/2000 | Artinian et al. | | 290/52 |
| 6,704,625 B2 * | 3/2004 | Albero et al. | | 701/3 |
| 7,059,136 B2 * | 6/2006 | Coffinberry | | 60/785 |
| 7,116,003 B2 * | 10/2006 | Hoppe | | 290/1 A |
| 7,295,440 B2 * | 11/2007 | Ganev et al. | | 361/714 |
| 7,325,401 B1 * | 2/2008 | Kesseli et al. | | 60/677 |
| 2002/0113167 A1 * | 8/2002 | Albero et al. | | 244/53 R |
| 2002/0162914 A1 * | 11/2002 | Albero et al. | | 244/53 R |
| 2003/0182944 A1 * | 10/2003 | Hoffman et al. | | 60/772 |
| 2003/0218887 A1 * | 11/2003 | Kojori et al. | | 363/16 |
| 2004/0129835 A1 * | 7/2004 | Atkey et al. | | 244/118.5 |
| 2004/0201359 A1 * | 10/2004 | Kumar | | 318/783 |
| 2005/0151019 A1 * | 7/2005 | Stevens | | 244/135 R |
| 2006/0042227 A1 * | 3/2006 | Coffinberry | | 60/226.1 |
| 2007/0210071 A1 * | 9/2007 | Ganev et al. | | 219/505 |
| 2007/0211435 A1 * | 9/2007 | Ganev et al. | | 361/714 |
| 2007/0259256 A1 * | 11/2007 | Le Canut et al. | | 429/90 |
| 2008/0304954 A1 * | 12/2008 | Hoffman et al. | | 415/17 |

\* cited by examiner

*Primary Examiner* — Mark Hellner
*Assistant Examiner* — Helal A Algahaim
(74) *Attorney, Agent, or Firm* — Oral Caglar, Esq.

(57) ABSTRACT

An aircraft architecture may be designed to create an optimal balance between electric power and bleed power in order to match or improve current more electric architecture (MEA) performance while simplifying power extraction from the engines as well as simplifying the electrical system. Conventional aircraft architectures may use electric only ECS and cabin pressurization systems (so-called "no bleed" systems). Alternatively, older conventional aircraft may use strictly engine bleed air to provide power for ECS and cabin pressurization systems. The present invention, on the other hand, provides an architecture which may optimize the use of both engine bleed air and MEA designs to provide a system that may be simpler and potentially more reliable and available as compared to conventional aircraft architectures.

17 Claims, 4 Drawing Sheets

SMART HYBRID ELECTRIC AND BLEED ARCHITECTURE

BACKGROUND OF THE INVENTION

The present invention generally relates to hybrid electric and bleed architectures for aircraft and more specifically, to systems and methods for finding the right balance between electric power and bleed power in order to match or improve current more electric architecture (MEA) performance while simplifying power extraction from the engines as well as simplifying the electrical system.

Many of today's aircraft use the extraction of thrust engine compressor bleed air to power the aircraft cabin and cargo ventilation system, the environmental control system (ECS), the wing and cowl anti-ice system (WAI) and the engine start system. The extraction of engine cycle compressor core bleed air places a significant penalty on the engine cycle, reducing engine efficiency. Much of the power inherent in the extracted bleed air, before the power is delivered to and used by the aircraft systems, is purposely wasted by pressure and temperature reduction in the bleed air control and distribution system to ensure that the hot bleed air conforms to aircraft material limits and is suitable for use by the aircraft systems. The bleed air extraction and distribution equipment required to use engine bleed air is expensive to purchase and install, heavy, and relatively unreliable.

Because of the above issues, the aircraft industry is moving toward more electric architectures. Even if, in most cases, electrifying aircraft systems can generate value, it is not always true and creates additional complexity on the electrical systems that can be difficult to justify.

U.S. Pat. No. 6,704,635 describes an electric based environmental control system (ECS) and cabin pressurization system. The only use of engine bleed air is for engine cowl anti-ice via a single bleed port. There is no teaching of optimizing the engine bleed air for ECS or cabin pressurization.

As can be seen, there is a need for an improved hybrid electric and engine bleed architecture in an aircraft that may provide for optimal use of bleed air for ECS and/or cabin pressurization.

SUMMARY OF THE INVENTION

In one aspect of the present invention, a hybrid electric and bleed system for a vehicle comprises an environmental control system having a pressurization circuit and a cooling circuit, the pressurization circuit providing an engine bleed air at or near cabin pressure; an electric system having at least one engine driven starter-generator, at least one auxiliary power unit driven starter-generator, at least one main AC bus, at least one DC bus and at least one variable voltage of variable frequency (VVVF) bus, wherein the main AC bus receives alternating current from the engine driven starter-generator or the auxiliary power unit driven starter-generator in a generation mode; the DC bus receives direct current from the main AC bus through at least one AC-to-DC power converter; the variable voltage of variable frequency bus receives variable voltage of variable frequency from the DC bus through at least one inverter/motor controller and the variable voltage of variable frequency bus supplies power to start the engine driven starter-generator or the auxiliary power unit driven starter-generator.

In another aspect of the present invention, an environmental control system integrating into a hybrid electric and bleed architecture of an aircraft comprises a cooling circuit receiving a mixed air comprising recirculated cabin air mixed with engine bleed air at or near cabin pressure; an air cycle machine having a compressor and a turbine and a motor; the compressor compressing the mixed air; a heat exchanger receiving the compressed mixed air; and the turbine cooling the compressed mixed air by expansion cooling.

In yet another aspect of the present invention, an electric system comprises a first and at least a second engine, each having at least one engine driven starter-generator; at least one APU driven starter-generator; at least one main AC bus; at least one DC bus; and at least one VVVF bus, wherein the main AC bus receives alternating current from the engine driven starter-generator or the APU driven starter-generator in a generation mode; the DC bus receives direct current from the main AC bus through at least one AC-to-DC power converter; and the VVVF bus receives variable voltage of variable frequency from the DC bus through at least one inverter/motor controller and the VVVF bus supplies power to start the engine driven starter-generator or the APU driven starter-generator.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides an aircraft architecture that may find an optimal balance between electric power and bleed power in order to match or improve current more electric architecture (MEA) performance while simplifying power extraction from the engines as well as simplifying the electrical system.

Conventional aircraft architectures may use electric only for ECS or for cabin pressurization systems (so-called "no bleed" systems). Alternatively, older conventional aircraft may use strictly engine bleed air to provide power for ECS or cabin pressurization systems. The present invention, on the other hand, provides an aircraft architecture which may optimize the use of both engine bleed air and MEA designs to provide a system that may be simpler and potentially more reliable and available as compared to conventional aircraft architectures. In other words, the present invention may optimize the electric design of the aircraft with respect to minimizing the use of bleed air. Additionally, the MEA described below in reference to the Figures is a relatively simple MEA design, as compared to conventional MEA designs, thereby resulting in a significant savings in the number and weight of the electrical components.

The fundamental reason why "no bleed" systems usually prove to be more efficient for ECS is not due to the inefficiency of the engine compressor, which, in fact, may be the best compressor on board the aircraft. The engine compressor, however, generally delivers pressure above what is required for ECS and forces pressure to be throttled (wasted). The present invention is designed to use an engine bleed system capable of normally providing bleed air above (but not generally more than 5 psi above in cruise to avoid waste), at or below cabin pressure, and thus, it may be the most efficient solution for pressurization.

By using engine bleed for only ECS (in other words, not for Wing anti icing (WAI) or other bleed loads), the present invention recognizes that a very simple bleed system may be realized, relying on a low pressure bleed port which may be sized to be at or below required cabin pressure for standard cruise altitude, speed and temperature (for example, supplying from about 10 psi to about 20 psi, typically about 15 psi at the engine port). Furthermore, as described in more detail below with respect to the drawings, the present invention may provide a higher pressure bleed port to provide pressure for off design cases, such as top of descent at maximum altitude, high altitude cruise, low speed, high temperature operations and ECS failure cases.

Figure 1:
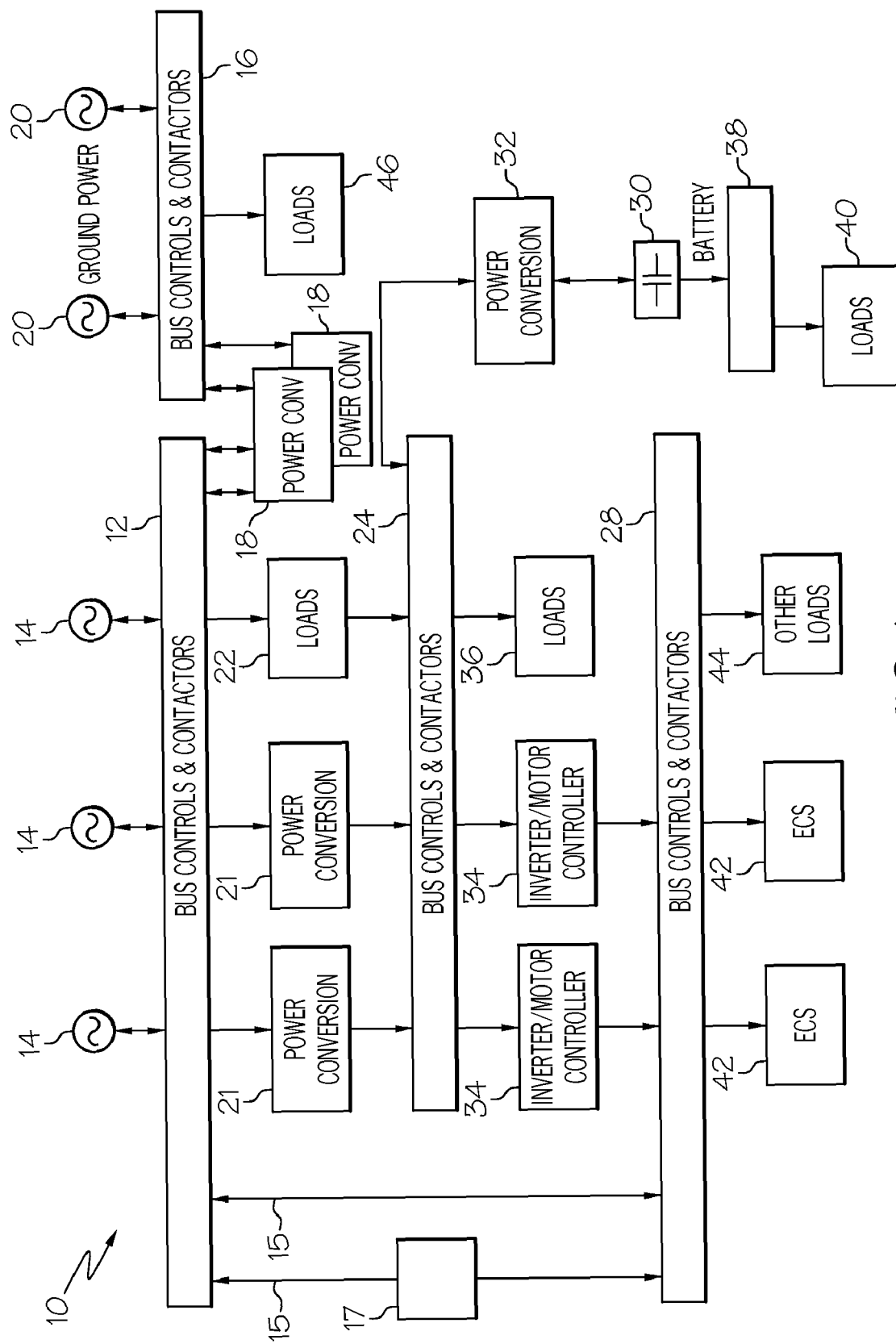
FIG. 1 is a schematic drawing showing an electric architecture according to one embodiment of the present invention.

Referring to FIG. 1, there is shown a schematic drawing showing the general concept of an electric architecture 10 according to one embodiment of the present invention. The electric architecture 10 may be used for WAI, motorized ECS (as further discussed below with reference to FIG. 3), and other aircraft loads. The electric architecture 10 may include a main alternating current (AC) bus 12. The number of main AC busses 12 may be driven by the specific requirements of the vehicle. For example, there may be from 1 to 5 AC busses 12 and typically, from 2 to 3 AC busses 12.

In generation mode, the main AC bus 12 may get AC power from engine and APU driven generators 14 or from secondary busses 16 through power converters 18. Secondary busses 16 may be powered via ground power 20. The main AC bus 12 may be used to drive AC power to loads 22, or to power direct current (DC) busses 24 (via AC-to-DC power converters 26, which may be, for example, AC-to-DC power rectifiers or power converters), or to drive power converters 18 to power secondary busses 16. In starting mode, the main AC bus 12 may get variable voltage of variable frequency (VVVF) from a VVVF bus 28.

The number of DC busses 24 that is needed may be driven by the specific requirements of the vehicle. For example, there may be from 1 to 6 DC busses 24 and typically, from 2 to 4 DC busses 24 in an aircraft. DC may be supplied to the DC bus 24 from the main AC bus 12 through the AC-to-DC power converters 26. Alternatively, DC may be supplied to the DC bus 24 from a battery 30 through DC-to-DC power converters 32. The DC bus 24 may provide DC to inverters/motor controllers 34 or loads 36 (such as, for example, WAI) and/or to the battery 30 through the DC-to-DC power converter 32. The battery 30 may have tied thereto a battery bus 38 for providing DC to loads 40. Power converters (not shown) may be integrated in the inverters/motor controllers 34 to provide current to the VVVF bus 28.

The number of VVVF busses 28 that is needed may also be driven by the requirements of the vehicle. For example, there may be from 1 to 5 VVVF busses 28 and typically, from 2 to 3 VVVF busses 28. VVVF may be obtained from DC busses 24 through the inverters/motor controllers 34. The VVVF busses 28 may be tied to multiple motors (such as an air cycle machine (ACM) motor (not shown) integrated into an ECS 42, described below) or other loads 44. Additionally, the VVVF busses 28 may be tied to the main AC bus 12 as shown by the arrows 15 to perform a start function for the engines and APU driven generators 14. A matrix converter 17 may convert the AC power from the main AC bus 12 into VVVF power at the VVVF busses 28. The matrix converter 17 may be a conventional matrix converter, such as, for example, that disclosed in U.S. Pat. No. 5,909,367, herein incorporated by reference.

The number of secondary busses 16 that is needed may also be driven by the requirements of the vehicle. The number of secondary busses 16 may also depend upon the number of external power plugs there are present on the vehicle. For example, there may be from 0 to 4 and typically, from 1 to 2 secondary busses 16. The secondary busses 16 may only be necessary if there is external power being provided to the vehicle and the power supplied to the vehicle is different (for example, different in voltage) from the power present at the main AC bus 12. In other words, the main AC bus 12 may be used as the secondary bus 16 if the power at the main AC bus 12 is the same as the power at the secondary bus 16 (as supplied by ground power 20). Power to the secondary busses 16 may be from ground power 20 or may be supplied from the main AC bus 12 through power converters 18. The secondary busses 16 may drive power to loads 46 or to the main AC bus 12 (when energized by ground power 20) through power converters 18.

Within the above description of FIG. 1, the term "loads" is used to refer to various electrical loads within the vehicle. For example, within a commercial aircraft, such loads may include loads for audio/visual functions, loads for food preparation/warming, loads for passenger power supplies and the like.

Figure 2:
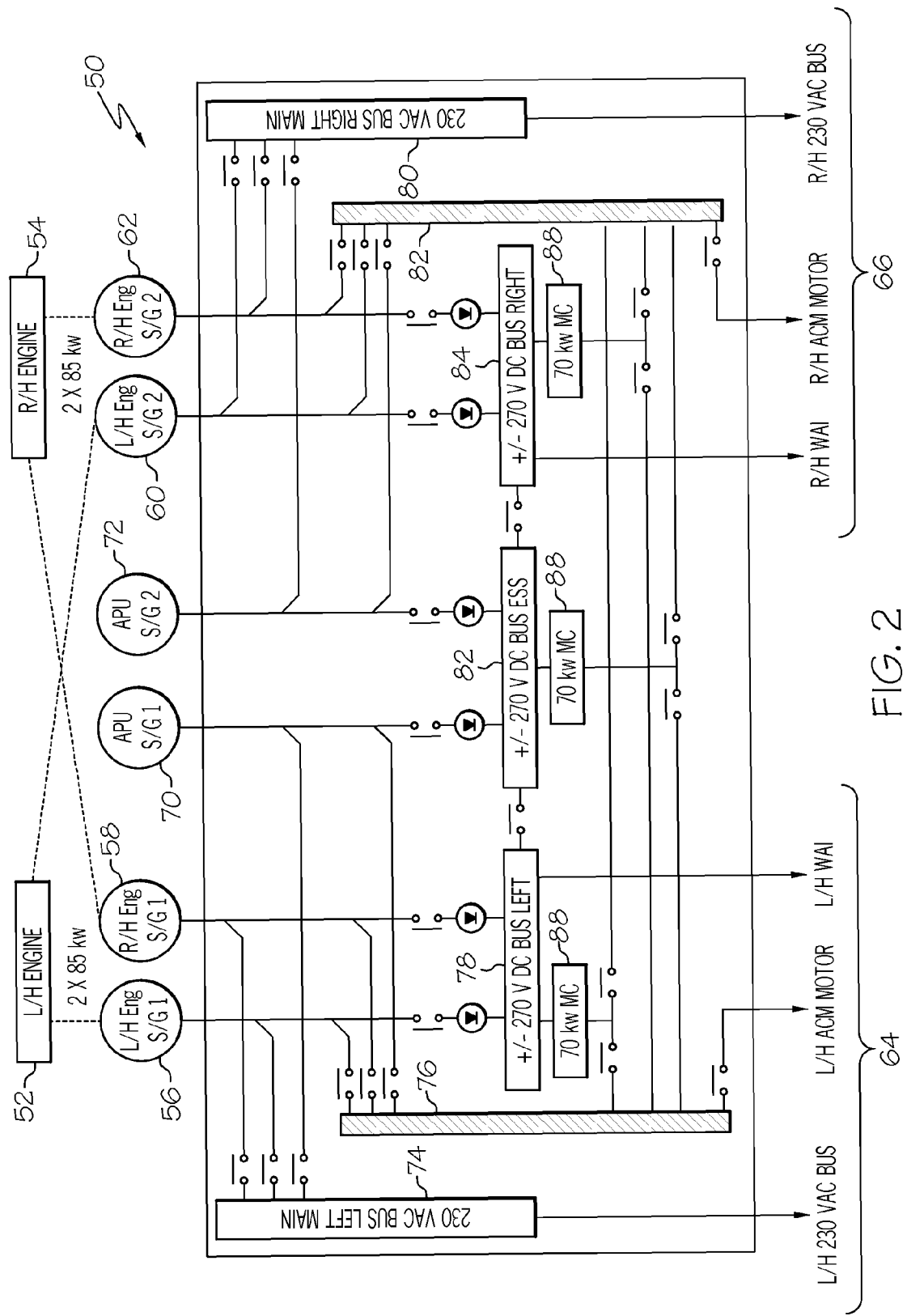
FIG. 2 is a schematic drawing showing an electric architecture according to another embodiment of the present invention.

Referring now to FIG. 2, there is shown a schematic drawing showing an electric architecture 50 according to another embodiment of the present invention. The electric architecture 50 of FIG. 2 may be described as a more detailed description of the general electric architecture 10 of FIG. 1. The specific details of FIG. 2 should not be taken in the absolute sense, but rather as an example of one possible embodiment of the present invention.

A left hand (L/H) engine 52 and a right hand (R/H) engine 54 may each have a first starter-generator 56, 58 (L/H, R/H) and a second starter-generator 60, 62 (L/H, R/H). In one embodiment of the invention, each of these starter-generators may be capable of producing 85 kilowatts (kW) of power. In the embodiment shown in FIG. 2, the L/H engine first starter-generator 56 and the R/H engine first starter-generator 58 may provide power for a L/H side 64 set of busses (as described in more detail below) and the L/H engine second starter-generator 60 and the R/H engine starter-generator 62 may provide power for a R/H side 66 set of busses. In this arrangement, should there be a failure of one engine (either the L/H engine 52 or the R/H engine 54), both the L/H side 64 set of busses and the R/H side 66 set of busses may still be energized, albeit by half the maximum power capability.

An auxiliary power unit (APU) (not shown) may have a first APU starter-generator 70 and a second starter-generator 72. In the embodiment described in FIG. 2, the first APU starter-generator 70 may provide power for the L/H side 64 set of busses and the second APU starter-generator 72 may provide power for the R/H side 66 set of busses. In one embodiment of the present invention, each of the APU starter-generators 70, 72 may provide 130 kW of power.

The electric architecture 50 described by FIG. 2 may provide high availability engines start and power generation. By having the two starter-generators 56, 58 of the L/H engine 52 and the two starter-generators 60, 62 of the R/H engine 52, as well as two APU starter-generators 70, 72 each split between two sets of busses (the L/H side 64 set of busses and the R/H side 66 set of busses), there results a high availability system. As discussed above, should one engine fail, there is still power delivered to all of the busses by the starter-generators of the other engine.

Figure 3:
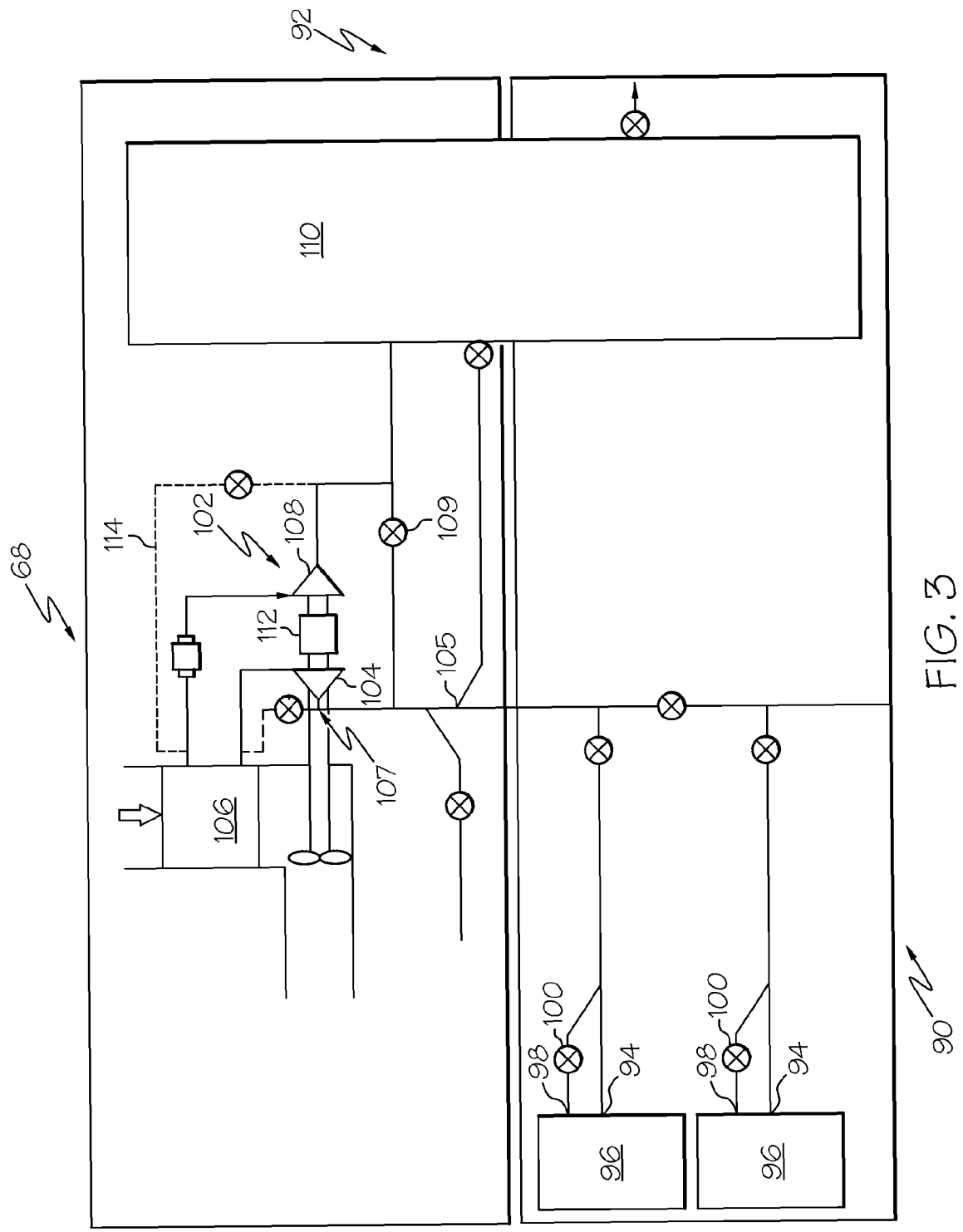
FIG. 3 is a schematic drawing showing a bleed architecture for an environmental control system according to an embodiment of the present invention.

The L/H side 64 set of busses may include a 230 VAC bus left main 74, a L/H motor controller (MC) bus 76 and a +/−270 V DC bus left 78. The R/H side 66 set of busses may include a 230 VAC bus right main 80, a R/H MC bus 82 and a +/−270 V DC bus right 84. Each APU starter-generator 70, 72 may be connected to a +/−270 V DC bus ESS 86. Each of the DC bus left 78, the DC bus right 84 and the DC bus ESS 86 may be electrically connected to a motor controller 88. The motor controllers 88 may provide electrical power for the motor 112 of the air cycle machine 102 as shown in FIG. 3 and as described in more detail below.

While FIG. 2 shows two starter-generators per engine, the present invention is not meant to be limited in this regard. While there may be improved dispatch reliability by the multiplicity shown in the embodiment of FIG. 2, one starter-generator per engine may also be contemplated within the scope of the present invention.

One example of a smart hybrid electric and bleed architecture will now be described with reference to FIG. 2 and FIG. 3.

WAI power may be provided by the electric architecture 50 of FIG. 2. Typically, the example envisions a generic single aisle aircraft, for which less than 70 kW may be required for wing de-icing or wet running and up to 140-180 kW for fully evaporative ice removal. With an all-electric WAI implementation, a simple installation may be realized with better controlled temperature environment, without the need for thermal shielding, leak detection and bleed temperature management, as is necessary with conventional hot bleed air WAI.

With respect to engine power, with electrical generation, the current example may assume a worst case scenario when WAI (70 kW) and aircraft systems (80 kW) have to be powered after an engine failure (one engine only left with two generators). A 150 kW generator may be required for generation (70+80 kW), but may fall short of what may be required for engine start under worst-case conditions (typically equivalent to a 170 kW generator). Therefore, a 230 VAC starter-generator rated at 170 kW may be needed. In the embodiment of FIG. 2, this is divided between two starter-generators (starter-generators 56 and 60, for example), each rated at 85 kW.

With respect to APU power, for ground operations, the APU would need to provide a total of about 260 kW (180 kW for ECS or main engine start and 80 kW for aircraft system loads). For extended-range twin engine operations (ETOPS) type dispatch (dispatch with one generator failed), the APU may need to provide a total of 150 kW at 25 kft (70 kW WAI and 80 kW aircraft loads) and 80 kW at 39 kft (80 kW aircraft loads) to support second generator or engine failures. Therefore, in this example, an APU may be fitted with one 260 kW starter-generator capable of 260 kW on the ground up to 14 kft, 180 kW at 25 kft and 80 kW at 39 kft. If required for higher start and power generation availability, as shown in FIG. 2, two 130 kW APU starter-generators 70, 72 may be used.

Referring to FIG. 3, there is shown a schematic drawing of a pressurization circuit 90 and a cooling circuit 68 for an environmental control system 92 according to an embodiment of the present invention. As discussed above, the engine bleed architecture, as part of the pressurization circuit 90, may use a low pressure bleed 94 from the engines 96. High pressure bleed 98 may be made available with a mixer or an ejector (with fixed or variable geometry) with the required valves 100 to raise the pressure of the LP bleed 94 if necessary, for example, upon descent or upon a failure mode. The cooling circuit 68 may reject heat and water from the air outside a pressure vessel, such as the cabin 110 of an aircraft.

The bleed air may be mixed with cabin recirculation air at a point 105 and delivered to the air cycle machine (ACM) 102 at a point 107. The mixed air may be compressed with compressor 104, passed through a heat exchanger 106, and expansion cooled with a turbine 108 to deliver conditioned air to the cabin 110. The ACM 102 may be a motorized ACM, driven by a motor 112. Motor 112 may receive electric power from one of the motor controllers 34 shown in FIG. 1. The motor controllers 34 may be used to control the motorized ACM driven by the motor 112. Depending on the pressurization provided from the pressurization circuit 90, the amount of power provided to the motor 112 may vary. For example, if substantial engine bleed air pressure (as will typically occur during the early portion of the climb phase) is provided, less power would need to be provided to the motor 112, as the compressor 104 may be driven by the engine bleed air pressurization. However, upon reduction of the engine bleed air pressure due to altitude or power setting, a motorized ACM, driven by the motor 112, may be used to provide adequate pressurization for the cabin 110. A temperature trim air valve 109 may regulate the amount of air, if any, that may be delivered to the cabin 110 prior to entry into the cooling circuit 68.

According to one embodiment of the invention, the ACM 102 may be shut down during certain points of the flight, thereby reducing the electric load required from one of the motor controllers 34 shown in FIG. 1. The bleed air (that might be mixed with recirculation air) rather than passing through the compressor 104, may simply be adequately cooled by the heat exchanger 106 via a bypass circuit 114 and delivered to the cabin 110. Should there be insufficient pressure to pressurize the cabin 110 (for example, as an alternative to using a high pressure bleed 98) or insufficient cooling, the ACM may be powered through the electronics described above (for example, powered by one of the motor controllers 34 shown in FIG. 1) to provide pressurization and expansion cooling.

Figure 4:
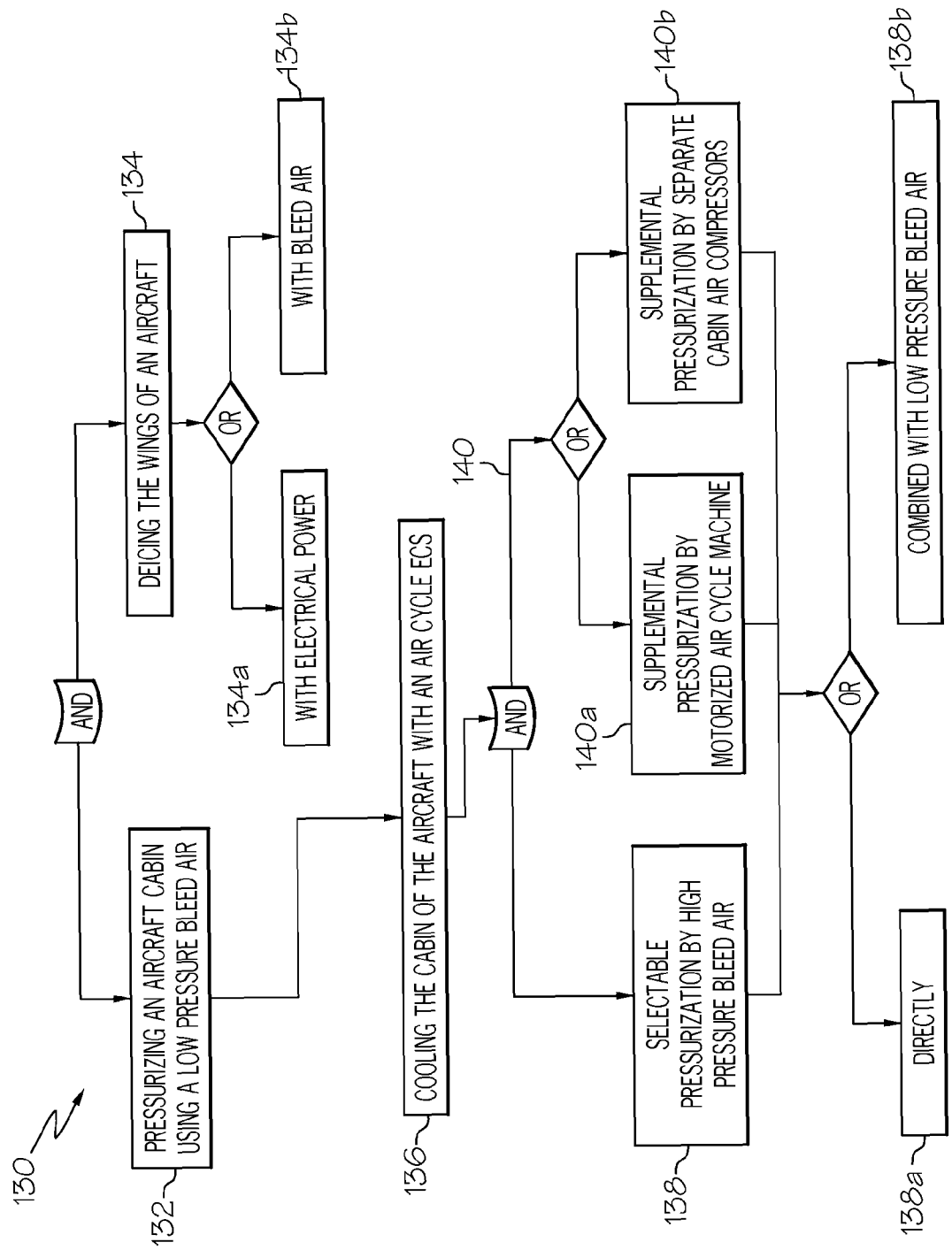
FIG. 4 is a flowchart describing a method according to the present invention.

Referring now to FIG. 4, there is shown a method 130 of optimizing bleed air and electrical power use in a hybrid electric bleed and electric architecture. The method 130 may include a step 132 of pressurizing an aircraft cabin (e.g., cabin 110) using a low pressure bleed air and an electric cabin air compressor. The method 130 may include another step 134 of deicing a wing of the aircraft with electrical power 134*a*. Alternatively, traditional pneumatic thermal anti ice 134*b* may be used in conjunction with the other aspects of this invention. A step 136 may provide cabin cooling with an electrically motorized air cycle machine. Optional steps may include a step 140 of supplemental pressurization performed by either the motorized air cycle machine 140*a* or a set of additional motorized cabin air compressors 140*b*. An optional step 138 may provide additional pressurization for the aircraft cabin using high pressure bleed air, directly 138*a* or in combination with low pressure bleed air 138*b* the pressure of which may then be thus raised.

It should be understood, of course, that the foregoing relates to preferred embodiments of the invention and that modifications may be made without departing from the spirit and scope of the invention as set forth in the following claims.

We claim:

1. A hybrid electric and bleed system for a vehicle, comprising:
   an environmental control system (ECS) having a pressurization circuit and a cooling circuit, the pressurization circuit providing air near cabin pressure, the cooling circuit rejecting heat and water from the air outside a pressure vessel and the ECS configured to be powered by mechanical power from pressurized bleed air and by electrical power through an electric motor;
   an electric system having at least one engine driven starter-generator, at least one auxiliary power unit driven starter-generator, at least one main AC bus, and at least one variable voltage of variable frequency bus, wherein
   the main AC bus receives alternating current from the engine driven starter-generator or the auxiliary power unit driven starter-generator in a generation mode;
   the variable voltage of variable frequency bus receives variable voltage of variable frequency either from a DC bus through at least one inverter/motor controller or from the main AC bus through at least one matrix converter, and the variable voltage of variable frequency bus supplies power to start the engine driven starter-generator or the auxiliary power unit driven starter-generator.

2. The hybrid electric and bleed system for a vehicle according to claim 1, wherein the electric architecture further comprises at least one secondary bus.

3. The hybrid electric and bleed system for a vehicle according to claim 2, wherein the secondary bus receives ground power and is electrically connected to the main AC bus through at least one AC-to-AC power converter.

4. The hybrid electric and bleed system for a vehicle according to claim 1, wherein the electric architecture further comprises at least one battery.

5. The hybrid electric and bleed system for a vehicle according to claim 4, wherein the battery may either receive or send power to the DC bus via a DC-to-DC power converter.

6. The hybrid electric and bleed system for a vehicle according to claim 1, wherein the main AC bus may be a 230 volt AC bus and the DC bus may be a +/−270 volt (540 volt) DC bus.

7. The hybrid electric and bleed system for a vehicle according to claim 1, wherein the ECS comprises:
   a compressor mechanically attached to a turbine;
   a motor controlling the rotation of the compressor and the turbine;
   a heat exchanger;
   a water extraction system; and
   a temperature trim air valve.

8. The hybrid electric and bleed system for a vehicle according to claim 7, further comprising bypass circuits allowing the bleed or mixed air comprising recirculated cabin air mixed with engine bleed air at or near cabin pressure to be cooled by the heat exchanger:
   i: without the operation of the motor, compressor and turbine if bleed air pressure is sufficient; or
   ii: with operation of the compressor, using motor assistance, if bleed pressure is too low.

9. The hybrid electric and bleed system for a vehicle according to claim 1, wherein the pressurization circuit receives the engine bleed air from:
   a low pressure bleed from an engine at a pressure no more than 5 psi above or less than cabin pressure in cruise operation; and
   a higher pressure bleed port.

10. The hybrid electric and bleed system for a vehicle according to claim 9, further comprising a mixer or an ejector, the ejector having fixed or variable geometry, with the required valves to inject bleed air from a high pressure engine bleed in order to increase the pressure of the engine bleed air delivered to the ECS.

11. The hybrid electric and bleed system for a vehicle according to claim 1, wherein the vehicle is a commercial aircraft.

12. A hybrid electric and bleed system comprising:
   an electric architecture, the electric architecture comprising:
      a first and at least a second engine, each having at least one engine driven starter-generator;
      at least one APU driven starter-generator;
      at least one main AC bus;
      at least one DC bus; and
      at least one VVVF bus, wherein
      the main AC bus receives alternating current from the engine driven starter-generator or the APU driven starter-generator in a generation mode;
      the DC bus receives direct current from the main AC bus through at least one AC-to-DC power converter; and
      the VVVF bus receives variable voltage of variable frequency from the DC bus through at least one inverter/motor controller and the VVVF bus supplies power to start the engine driven starter-generator or the APU driven starter-generator; and
   a bleed architecture, the bleed architecture comprising:
      an environmental control system having a pressurization circuit and a cooling circuit, the pressurization circuit providing air near cabin pressure and the cooling circuit rejecting heat and water from the air outside a pressure vessel; and
      a compressor configured to be selectively operable by electrical power delivered to an electric motor, mechanical power delivered by pressurized bleed air to a turbine to drive the compressor or a combination of the electrical power and the mechanical power.

13. The hybrid electric and bleed system according to claim 12, wherein:
   the first engine has a first engine first starter-generator and a first engine second starter-generator; and
   the second engine has a second engine first starter-generator and a second engine second starter-generator.

14. The hybrid electric and bleed system according to claim 13, wherein:
   the first engine first starter-generator and the second engine first starter-generator power a left-hand side of the electric architecture; and
   the first engine second starter-generator and the second engine second starter-generator power a right-hand side of the electric architecture, thereby providing an electric architecture with high dispatch reliability.

15. The electric system according to claim 12, wherein:
   the electric architecture further comprises at least one secondary bus; and
   the secondary bus receives ground power and is electrically connected to the main AC bus through at least one AC-to-AC power converter.

16. The electric system according to claim 12, wherein:
   the electric architecture further comprises at least one battery; and
   the battery may either receive or send power to the DC bus via a DC-to-DC power converter.

17. The hybrid electric and bleed system for a vehicle according to claim 1 wherein the pressurization circuit receives pressurized ram air from a set of motorized cabin air compressors.

* * * * *